United States Patent [19]

Frimml et al.

[11] Patent Number: 5,394,682
[45] Date of Patent: Mar. 7, 1995

[54] ROUND BALER PICKUP HAVING STIFF TEETH

[75] Inventors: Roger W. Frimml; Henry D. Anstey, both of Ottumwa, Iowa; Jean Viaud, Sarreguemines, France

[73] Assignee: Deere & Company, Moline, Ill.

[21] Appl. No.: 150,636

[22] Filed: Nov. 9, 1993

[51] Int. Cl.⁶ ..................... A01D 80/02; A01D 89/00
[52] U.S. Cl. ........................................ 56/341; 56/364; 460/122
[58] Field of Search ............... 56/341, 364, 374, 400, 56/DIG. 21; 100/88; 460/121, 122

[56] References Cited

U.S. PATENT DOCUMENTS

| | | | |
|---|---|---|---|
| 2,732,678 | 1/1956 | Blaser et al. | 56/341 X |
| 2,854,808 | 10/1958 | Ramacher et al. | 56/400.02 X |
| 3,514,937 | 6/1970 | Batog | 56/364 X |
| 3,872,657 | 3/1975 | Ramacher et al. | 56/364 X |
| 4,136,510 | 1/1978 | Crawford et al. | 56/341 |
| 5,088,275 | 2/1992 | Koorn et al. | 56/364 |

*Primary Examiner*—George A. Suchfield

[57] ABSTRACT

A large round baler has a pickup including a tined reel mounted beneath an inlet at the bottom of an expansible baling chamber for picking up windrowed crop and delivering it into the inlet. The teeth of the tined reel are constructed so as to be in the neighborhood of at least two times stiffer than conventional teeth for the purpose of enhancing bale starting and diminishing plugging by effecting a constant smooth delivery of crop to the baling chamber. An embodiment is disclosed wherein ultra-stiff teeth, teeth which are so stiff as to be virtually inflexible, are used at selected areas across the width of the reel together with the stiff teeth.

15 Claims, 3 Drawing Sheets

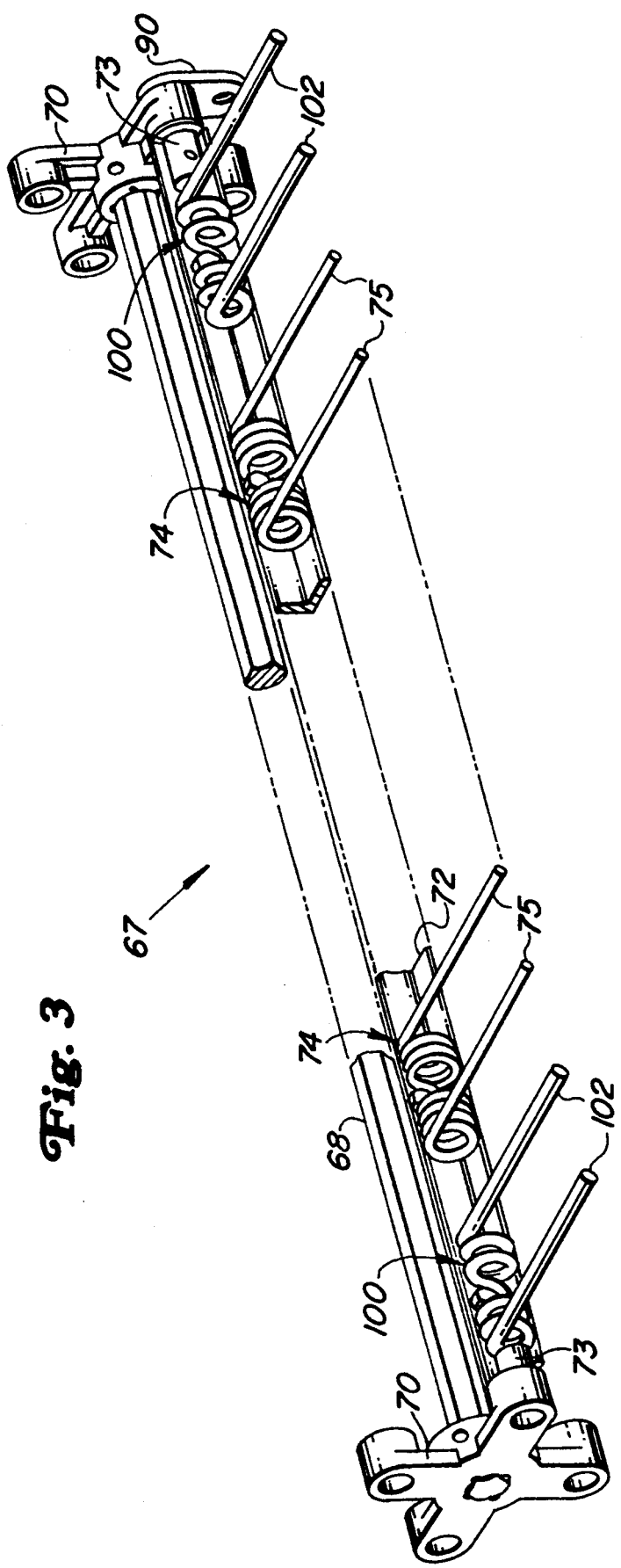

ROUND BALER PICKUP HAVING STIFF TEETH

BACKGROUND OF THE INVENTION

The present invention relates to crop harvesting implements having pickup attachments for lifting windrows of crop materials to crop processing elements of the implements and more particularly relates to the teeth of such pickups as are used for conveying crop to the baling chamber of an "open throat" large round baler, i.e., one that does not use any compression rolls through which crop passes on its way to the baling chamber.

The feeding of crop into round balers of "open throat" design during the initiation of bale formation has long posed a problem. This is because these open throat balers rely on the growing or forming bale in the baling chamber to help feed the crop into the baler. Thus, until the bale starts to roll, the feeding of crop to the baling chamber comes almost totally from the pickup device. This requires extra care by the operator to avoid plugging the baler during the first few feet of forward travel. It is particularly important to be careful to avoid getting crops caught at or near the ends of the pickup device, because part of the windrow occasionally extends beyond the end of the pickup. This creates an extra volume of crop to be fed into the baler at the ends of the pickup. Unfortunately, it is fairly common for this situation to occur during bale starting because, in the typical case, the operator of the tractor pulling the baler has backed up the baler to discharge a just-completed bale and upon driving forward after such discharge approaches the windrow at an angle. Just as typically, in order to form a bale having a good shape, an operator will intentionally drive the tractor in a weaving pattern so that the trailing baler moves back and forth relative to the windrow for the purpose of adding more crop to an end of the bale which is smaller than the other end. After discharge of such a bale, the baler may still be positioned for feeding crop at that end of the pickup where feeding was taking place when the previous bale was finished.

Another factor which contributes to difficult bale starting is the orientation or stiffness of crop stems, as well as the slipperiness of crop against the bale-forming belts. This is so because, if the incoming crop is difficult to flex or grip compared to normal crops, it is relatively difficult to have the crop begin rolling up on itself. This would be analogous, for example, to the relative ease of rolling up a flexible carpet or sleeping bag as opposed to rolling up a stiffer bed mattress or a slippery, stiff sheet of plastic.

SUMMARY OF THE INVENTION

According to the present invention there is provided a pickup improved for feeding heavy crop at the ends of the pickup and for effecting initiation of the formation of a bale in the baling chamber of a round baler having an open throat.

A broad object of the invention is to provide a crop harvesting implement with a pickup having at least some teeth which are stiffer than conventional teeth for maintaining a smooth, even crop flow into crop processing elements of the implement.

A more specific object of the invention is to provide a harvesting implement with a pickup, as set forth in the previous object, wherein teeth at opposite end portions of the pickup are essentially inflexible during normal operating conditions.

Yet another object of the invention is to provide a pickup for a large round baler wherein the pickup has teeth considerably stiffer than those conventionally associated with a baler pickup so that a more positive and even flow of crop occurs which aids in the initial roll up of crop during bale formation and also in reducing plugging.

These and other objects will become apparent from a reading of the ensuing description together with the appended drawings.

BRIEF DESCRIPTION OF THE DRAWINGS

FIG. 3 is a perspective view of the pickup spiders and tooth bars showing an embodiment where ultra-stiff teeth are mounted at end portions of the tooth bars together with stiff teeth in the central portions of the bars.

DESCRIPTION OF THE PREFERRED EMBODIMENT

Initially, it is to be noted that various components are described as existing in pairs while only one of each pair is shown and it is to be understood that the unshown component is the same or similar in construction to the one shown.

Figure 1:
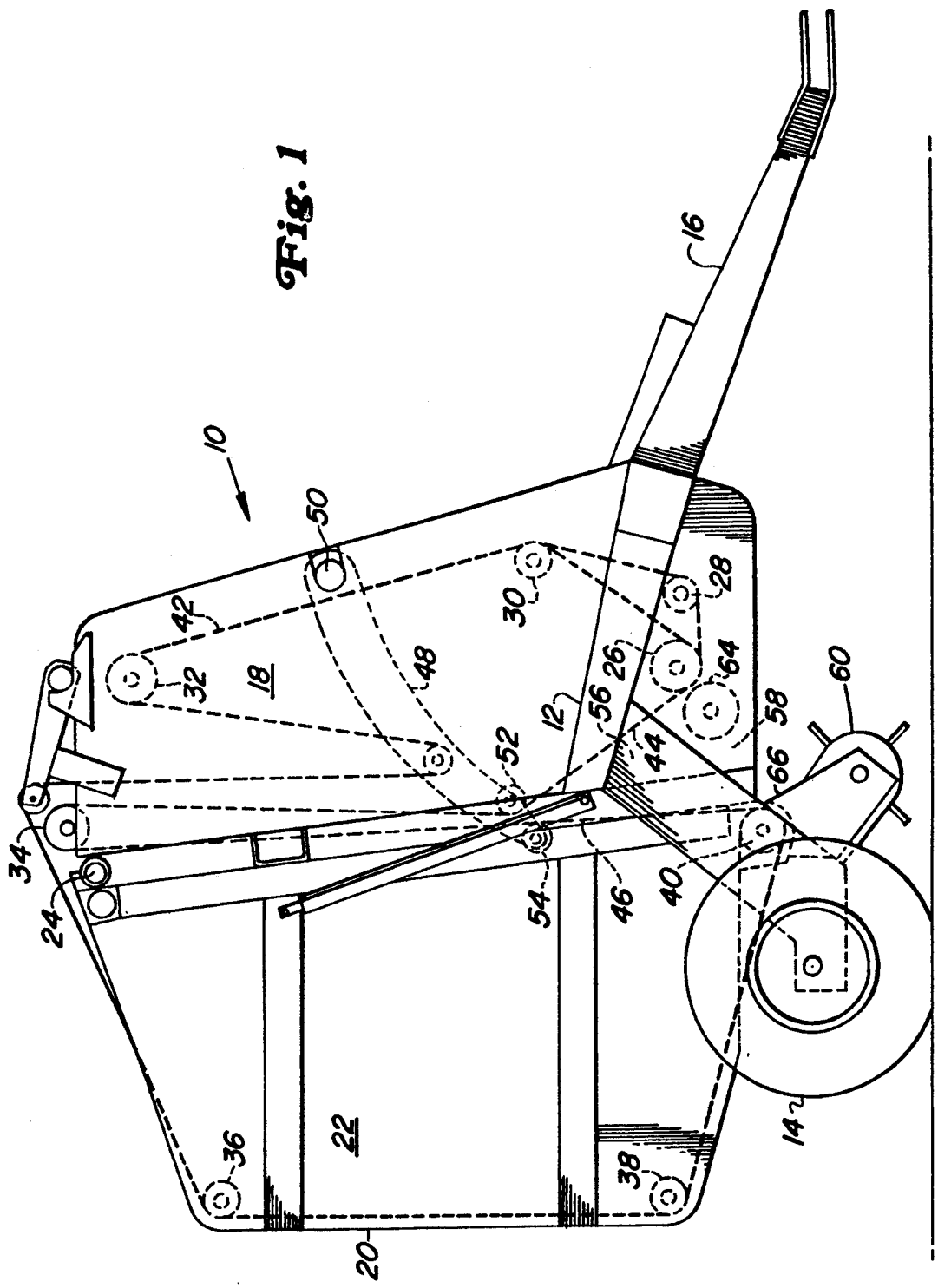
FIG. 1 is a right side elevational view of a large round baler with which a pickup constructed in accordance with the present invention is particularly adapted for use.

Referring now to FIG. 1, there is shown a baler 10 of the type for making large cylindrical bales and commonly called a large round baler. The baler 10 comprises a main frame 12 supported on a pair of ground wheels 14 and having a draft tongue 16 secured thereto and adapted for being connected to a tractor. A pair of transversely spaced vertical sidewalls 18 is joined to the frame 12 and has respective upright rear ends. A bale discharge gate 20 including opposite side walls 22 is vertically pivotally attached, as at 24, to upper rear locations of the sidewalls 18, the sidewalls 22 having forward ends which abut against the rearward ends of the sidewalls 18 when the gate 20 is in a lowered closed position as shown.

The pairs of sidewalls 18 and 22 rotatably support the opposite ends of a plurality of bale-forming belt support rolls adjacent the periphery of the sidewalls. Specifically, beginning at a lower central location of the sidewalls 18 and proceeding counterclockwise, there are mounted a driven roll 26, a lower front roll 28, an intermediate front roll 30, an upper front roll 32, and an upper rear roll 34; and continuing counterclockwise from an upper rear location of the gate sidewalls 22 there is mounted an upper rear roll 36, a lower rear roll 38 and a lower front roll 40. A plurality of endless bale-forming belts 42 are spaced one from the other across the space between the opposite pairs of sidewalls 18 and 22. Except for some of the belts 42 which skip the lower front roll 28, the belts are trained so that they serially engage the rolls 26, 28, 30, 32, 36, 38, 40 and 34. A front run 44 of the belts 42 extends upwardly from driven roll 26 to the roll 34. Similarly, a rear run 46 of the belts 42 extends upwardly from the lower front gate roll 40 to the roll 34. Mounted between rear end locations of a pair of rearwardly extending tensioning arms 48 which are vertically pivotally mounted, as at 50, to a mid-height location at the front of the sidewalls 18 are closely spaced, front and rear idler rolls 52 and 54. The front and rear runs 44 and 46 of the belts 42 respectively converge upwardly from the drive roll 26 and lower front gate roll 40 and pass closely to each other between the rolls 52 and 54, with the run 44 contacting a rear surface of the front roll 52 and with the run 46 contacting a forward surface of the rear roll 54. The runs 44 and 46 thus cooperate with the sidewalls 18 and 22 to deadline a baling chamber 56 which is closed at its top by the idler rolls 52 and 54 and, as viewed in vertical cross section from the side, is wedge-shaped. The bottom of the chamber 56 is provided with an inlet 58 (see also FIG. 2) extending between the driven roll 26 and the lower front gate roll 40. Crop products are introduced into the inlet 58 by a pickup 60 for being rolled into a bale 62 (shown only in FIG. 2) by the action of the front and rear runs 44 and 46 of the belts 42, which are respectively driven so as to travel toward and away from the inlet, and initially also by a starter roll 64 rotatably mounted in the sidewalls 18 adjacent to and being driven in the same direction as the driven roll 26 so that it operates to strip crop being carried downwardly by the front run of belts 44. As the bale 62 is being formed, the chamber 56 yieldably expands against the force established in the belts by a tensioning system including the pair of tensioning arms 48 together with springs and hydraulic cylinders (not shown) coupled between the walls 18 and the arms 48 for resisting upward movement of the arms. Once the bale 62 reaches a certain size, the weight thereof is borne mainly by the lower front gate roll 40 but also by the driven roll 26 and the starter roll 64.

Figure 2:
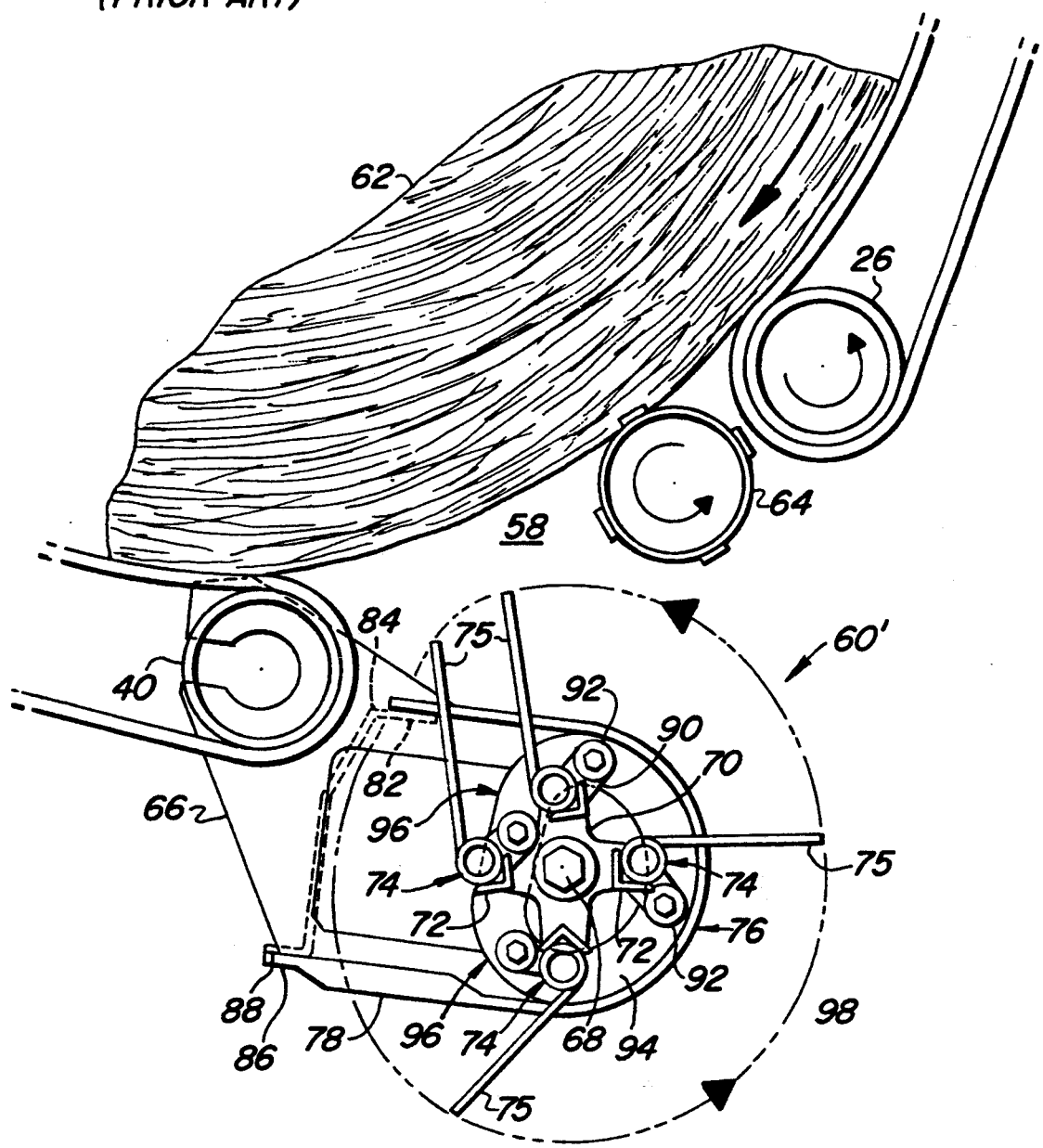
FIG. 2 is an enlarged sectional view showing the baling chamber receiving crop for starting a bale. an inlet at the bottom of an expansible baling chamber deliver.

Referring now also to FIGS. 2 and 3, it can be seen that the pickup 60 has a frame 66 pivotally mounted to the baler frame 12 for moving or being adjusted about an axis, which in this case is coincident with the axis of rotation of the lower front gate roll 40. The pickup frame 66 is shown in the upper range of its movement or adjustment. The pickup 60 includes a tined reel structure 67 including a central drive shaft 68 of hexagonal cross section on which a pair of spiders 70 are fixedly mounted at transversely spaced locations. The spiders 70 each have four equi-angularly spaced arms and tooth bars 72, formed of angle iron, extend between timed arms of the pair of spiders and are pivotally mounted thereto by cylindrical pins 73 that are releasably bolted to the opposite ends of each tooth bar and pivotally received in bores provided in each pair of timed arms. Secured to each tooth bar 72 at transversely spaced locations therealong are spring teeth 74, each including a coiled inner part bolted to the angle iron and a pair of tines 75 extending outwardly from opposite ends of the inner part, as is conventional. Each group of four teeth 74, respectively mounted to a common location of the four tooth bars 72, have first and second sets of coplanar tines 75. A U-shaped stripper assembly 76 opens rearwardly and comprises separate strippers 78 in the form of bands located between each set of coplanar tines 75 of each group of four teeth 74 so that slots are formed between adjacent strippers for permitting free travel of the tines therethrough. As viewed from the side, each stripper 78 has a forward semi-circular nose portion joined to upper and lower parallel legs, with a rear end of the upper leg being bolted, as at 82, to an upper, flat transverse surface 84 of the pickup frame 66, and with the lower leg being bolted, as at 86, to a lower, flat transverse surface 88 of the frame 66. Provided for effecting controlled rocking motion of the tooth bars 72 and hence desired motion of the tines 75 as the tooth bars 72 revolve with the shaft 68 and spiders 70 is a cam assembly including arms 90 respectively welded to the outer ends of the pins respectively secured to the right ends of the four tooth bars 72. Mounted to each of the arms 90 is a cam roller 92 received in an endless, inwardly opening, substantially D-shaped track 94 of a cam 96 that is bolted to a left, upright side (not shown) of the pickup frame 66. As the rollers 92 travel along the track 94, they cause the tooth bars 72 to be rocked so as to cause the outer ends of the tines 75 of the teeth 74 to trace a path indicated at 98. It can be seen that as the teeth 74 reach the top or twelve o'clock position of their travel the tines 75 are caused to swing forwardly so that a major component of the movement of the tines is downward as the tines are withdrawn below the plane of the upper legs of the strippers 78.

To this point the description has been that of a conventional baler and pickup. However applicant's pickup is not conventional because the teeth 74 and hence tines 75 are much stiffer than conventional teeth.

Specifically, one known conventional tooth has the following stiffness:

(a) spring rate per tine=1.44 in-lb per degree of deflection; and (b) tip force perpendicular to the tine=9 lb. at 41 degrees of deflection.

It is thought that no one in the industry has teeth having a spring rate in excess of 2 in-lb per degree of deflection. Applicant's teeth 74 have the following stiffness:

(a) spring rate per tine 75=3.96 in-lb per degree of deflection; and (b) tip force perpendicular to the tine 75=25 lbs. at 41 degrees of deflection.

Thus, the teeth 74 are about twice as stiff as the stiffest teeth thought to be in use and are about 2.5 times the stiffness of the known conventional teeth.

The following field tests were made comparing the operation of a baler equipped with a pickup having conventional teeth with the known tooth stiffness, set forth above, and a similar second baler equipped with a pickup having teeth with the stiffness of the teeth 74, per the above:

1. During a 13 hr. day baling wheat straw, the baler with the teeth 74 was able to produce 266 bales while the other baler was able to produce only 189 bales. Thus, the baler with the teeth 74 achieved a 40% increase in productivity over the other baler. The operation of these two balers in various conditions and crops over several days resulted in the baler with the teeth 74 achieving from 15–20% increase in productivity over the other baler in producing a total of 4000 bales.

2. During a more limited test baling sweet cane sorghum, a first baler having a pickup equipped with the teeth 74 was able to effectively start 100% of 12 bales attempted while a second baler equipped with conventional teeth was not able to start any bales. In another test in baling sorghum, the baler equipped with conventional teeth had great difficulty in starting bales, even with special operating techniques while balers equipped with the stiffer teeth did not experience any difficulty in starting bales.

3. During baling grass and legume silage bales, the baler having a pickup equipped with the teeth 74 had less difficulty in starting bales than did the baler having a pickup equipped with conventional teeth. Furthermore, there was no tendency, in the baler having its pickup equipped with the stiff teeth, for the crop to wrap about the starter roll (only one wrap in 600 bales) which was considered very good performance since this baler was not equipped with a starter roll scraper for preventing wrapping as was the baler having the pickup equipped with the conventional teeth, such scraper being considered necessary equipment to prevent wrapping.

Thus, the above tests tend to show that the stiff teeth 74 are superior to conventional teeth in the starting of bales in difficult crops and in productivity, i.e., "through put". Further, the tests tend to show that the stiff teeth 74 feed difficult silage crops with little tendency for the crops to wrap on the starter roll. Although, only one size of stiff tooth was used in the tests indicated above, it is thought that a tooth exhibiting a tip force of at least 19 lbs. at 41 degrees of deflection would also greatly enhance bale starting and feeding when operating in difficult crop.

Referring now to FIG. 3, there is shown a slight variation in the pickup 60 where the stiff teeth 74 are accompanied by very stiff or ultra-stiff teeth 100 having tines 102. These teeth 100 are about ten times stiffer than conventional pickup teeth and, hence, are about four times stiffer than the tines 75 of the stiff teeth 74. Thus, the tines 102 are essentially inflexible under normal operating conditions. While these teeth 100 are shown with a coiled inner portion, it has been found that U-shaped teeth made of bar stock without coils may also be used to enhance operation.

As illustrated, one tooth 100 is mounted at each end of each tooth bar 72, with the teeth 74 being mounted along the center portion the tooth bar 72. The purpose of the teeth 100 is to make the feeding at the ends of the pickup 60 more positive or aggressive since, as stated above, it is particularly important to avoid the hesitation of crop to feed during the bale starting process as such hesitation leads to plugging and such hesitation using conventional pickups almost always occurs at or near the ends of the pickup device when extra crop extends beyond the end of the pickup and, thus, creates an extra volume of crop to be fed into the baling chamber. If such agressive feeding over a wilier section of the ends of the pickup is desired, more teeth 100 may be used at each end. Further it has been found that in some crop conditions feeding may be enhanced by intermixing the teeth 100 with the teeth 74 across the middle portion of the pickup.

We claim:

1. In a crop harvesting implement including a pickup having a reel equipped with teeth having tines for lifting a windrow of crop and advancing it directly into engagement with further crop processing elements of the implement, the improvement comprising: all of said teeth of said reel having tines having a stiffness such that at least 19 lbs. of force is required to be applied to the tip of the tine to deflect the tine through forty-one degrees.

2. In a crop harvesting implement including a pickup having a reel equipped with teeth having tines for lifting a windrow of crop and advancing it directly into engagement with further crop processing elements of the implement, the improvement comprising: some of said teeth of said reel having tines having a stiffness such that at least 19 lbs. of force is required to be applied to the tips of the tines to deflect them through forty-one degrees; and the remainder of the tines being at least four times stiffer than said some of the tines.

3. The crop harvesting implement defined in claim 2 wherein said remainder of the tines are located solely at opposite end portions of said reel.

4. The crop harvesting implement defined in claim 2 wherein said remainder of the tines are intermixed with said some of the tines across the length of the reel.

5. In a crop harvesting implement including a pickup having a reel equipped with teeth having tines for lifting a windrow of crop and advancing it directly into engagement with further crop processing elements of the implement, the improvement comprising: at least some of the tines of said teeth being essentially inflexible under normal operating conditions.

6. The crop harvesting implement defined in claim 5 wherein said at least some of the tines are located only at opposite end portions of said reel.

7. In a large round baler including baling chamber having an inlet at the bottom thereof and a pickup located below said inlet and having a reel including teeth having tines for elevating windrowed crop and placing it directly in said inlet, the improvement comprising: at least some of the tines of said teeth having a stiffness such that at least 19 lbs. force applied to the tip of the tine is required to deflect the tine through forty-one degrees.

8. The large round baler defined in claims 7 wherein all of the tines of said reel have said stiffness.

9. The large round baler defined in claim 7 wherein those tines having said stiffness are at least located at the opposite ends of said reel.

10. The large round baler defined in claim 7 wherein some of the tines of said reel have said stiffness and the remainder of the tines being at least four times stiffer than said some of the tines.

11. The large round baler defined in claim 10 wherein said remainder of the tines are located solely at opposite end portions of said reel.

12. The large round baler defined in claim 11 wherein said remainder of the tines are intermixed with said some of the tines across the length of the reel.

13. In a large round baler including a baling chamber having an inlet at the bottom thereof and a pickup located below said inlet and having a reel including teeth having tines for elevating windrowed crop and feeding it directly to a further crop processing element of said baler, the improvement comprising: at least some of the tines of said teeth having a stiffness which makes them substantially inflexible during normal operation.

14. The large round baler defined in claim 13 wherein said at least some of the tines of said teeth are located at opposite end portions of said reel.

15. The large round baler defined in claim 13 wherein said baling chamber is defined by at least one baler belt supported on a plurality of rolls extending between opposite side walls of the baler and said further crop processing element being, as considered with the chamber empty, an upright belt run extending upwardly from one of the plurality of rolls, with the latter named roll being at the rear of said inlet.

* * * * *